(12) United States Patent
Hong et al.

(10) Patent No.: US 11,356,193 B2
(45) Date of Patent: Jun. 7, 2022

(54) RATE MATCHING AND HARQ WITH IRREGULAR MODULATION

(71) Applicant: IDAC HOLDINGS, INC., Wilmington, DE (US)

(72) Inventors: Sungkwon Hong, Seoul (KR); Onur Sahin, London (GB); Chunxuan Ye, San Diego, CA (US)

(73) Assignee: IDAC HOLDINGS, INC., Wilmington, DE (US)

( * ) Notice: Subject to any disclaimer, the term of this patent is extended or adjusted under 35 U.S.C. 154(b) by 0 days.

(21) Appl. No.: 16/339,947

(22) PCT Filed: Oct. 6, 2017

(86) PCT No.: PCT/US2017/055665
§ 371 (c)(1),
(2) Date: Apr. 5, 2019

(87) PCT Pub. No.: WO2018/068025
PCT Pub. Date: Apr. 12, 2018

(65) Prior Publication Data
US 2020/0052809 A1 Feb. 13, 2020

Related U.S. Application Data

(60) Provisional application No. 62/405,558, filed on Oct. 7, 2016.

(51) Int. Cl.
*H04L 1/00* (2006.01)
*H04L 1/18* (2006.01)

(52) U.S. Cl.
CPC .......... *H04L 1/0003* (2013.01); *H04L 1/0013* (2013.01); *H04L 1/0071* (2013.01); *H04L 1/1812* (2013.01); *H04L 1/1874* (2013.01)

(58) Field of Classification Search
CPC ... H04L 1/0003; H04L 1/0013; H04L 1/0071; H04L 1/1812; H04L 1/1874; H04L 1/00; H04L 1/0067
See application file for complete search history.

(56) References Cited

U.S. PATENT DOCUMENTS 9,781,707 B2 10/2017 Cheng et al.
10,009,146 B2 6/2018 Shen et al.
(Continued)

FOREIGN PATENT DOCUMENTS

CN 101075857 A 11/2007
CN 101119182 A 2/2008
(Continued)

OTHER PUBLICATIONS

Arikan, "Channel Polarization: A Method for Constructing Capacity-Achieving Codes for Symmetric Binary-Input Memoryless Channels," IEEE Transactions on Information Theory, vol. 55, No. 7, pp. 3051-3073 (Jul. 2009).
(Continued)

*Primary Examiner* — Lakeram Jangbahadur
(74) *Attorney, Agent, or Firm* — Volpe Koenig

(57) ABSTRACT

A method and system for rate matching in a wireless communication system is disclosed. The method comprises receiving K information bits at a channel encoder and generating N output bits. The N output bits may be interleaved by an interleaver. In a HARQ retransmission the output bits may be placed into a circular buffer. The N output bits may be divided into two or more parts comprising at least a first part and a second part. The method further comprises mapping a first part of one or more parts of the N output bits to a $M_1$ $(=2^{m_1})$-ary modulation and mapping a second part of one or more parts of the N output bits to a $M_2$ $(=2^{m_2})$-ary modulation. The output bits may be transmitted by a wireless transmit/receive unit (WTRU), a base station, or the like.

12 Claims, 15 Drawing Sheets

(56) References Cited

U.S. PATENT DOCUMENTS

| | | | |
|---|---|---|---|
| 2005/0216821 A1 | 9/2005 | Harada | |
| 2009/0049359 A1* | 2/2009 | Malladi | H04L 1/0013 714/752 |
| 2009/0086849 A1* | 4/2009 | Tsai | H04L 1/005 375/298 |
| 2009/0125774 A1* | 5/2009 | Kim | H04L 1/189 714/748 |
| 2009/0225894 A1* | 9/2009 | Yoshii | H04L 27/34 375/295 |
| 2009/0238066 A1* | 9/2009 | Cheng | H04L 1/0067 370/216 |
| 2010/0166111 A1* | 7/2010 | Park | H04L 1/1819 375/298 |
| 2015/0010103 A1* | 1/2015 | Murakami | H04L 1/003 375/267 |
| 2017/0005753 A1* | 1/2017 | Shen | H04L 1/1819 |
| 2019/0150132 A1 | 5/2019 | Bala et al. | |

FOREIGN PATENT DOCUMENTS

| | | |
|---|---|---|
| EP | 1 816 820 | 8/2007 |
| EP | 2 056 513 | 5/2009 |
| EP | 3142282 A1 | 3/2017 |
| WO | 2014203947 A1 | 12/2014 |

OTHER PUBLICATIONS

Chen et al., "A Hybrid ARQ Scheme Based on Polar Codes," IEEE Communications Letters, vol. 17, No. 10, pp. 1996-1999 (Oct. 2013).

Huawei et al., "Channel coding for URLLC," 3GPP TSG RAN WG1 Meeting #89 Meeting, R1-1707007, Hangzhou, China (May 15-19, 2017).

Li et al., "Capacity-Achieving Rateless Polar Codes," arXiv:1508.03112 (Aug. 2015).

Niu et al., "Beyond turbo codes: Rate-compatible punctured polar codes," Proceedings of the IEEE International Conference on Communications (ICC), Budapest, Hungary, pp. 3423-3427 (Jun. 2013).

Schreckenbach et al., "Adaptive Bit-Interleaved Coded Irregular Modulation," Proceedings of the 14th IST Mobile & Wireless Communications Summit, pp. 1332-1336 (Jun. 2005).

Third Generation Partnership Project, "Technical Specification Group Radio Access Network; Evolved Universal Terrestrial Radio Access (E-UTRA); Multiplexing and channel coding (Release 14)," 3GPP TS 36.212 V14.0.0 (Sep. 2016).

Third Generation Partnership Project, "Technical Specification Group Radio Access Network; Evolved Universal Terrestrial Radio Access (E-UTRA); Multiplexing and channel coding (Release 14)," 3GPP TS 36.212 V14.4.0 (Sep. 2017).

Vangala et al., "A Comparative Study of Polar Code Constructions for the AWGN Channel," arXiv: 1501.02473v1 [cs.IT] (Jan. 11, 2015).

Wang et al., "A Novel Puncturing Scheme for Polar Codes," IEEE Communications Letters, vol. 18, No. 12, pp. 2081-2084 (Dec. 2014).

* cited by examiner

RATE MATCHING AND HARQ WITH IRREGULAR MODULATION

CROSS REFERENCE TO RELATED APPLICATIONS

This application is the U.S. National Stage, under 35 U.S.C. § 371, of International Application No. PCT/US2017/055665 filed Oct. 6, 2017, which claims the benefit of U.S. Provisional Application No. 62/405,558, filed Oct. 7, 2016, the content of which are hereby incorporated by reference herein.

BACKGROUND

As wireless communication advances, generational standards advance based on the requirements of new use cases. In a fifth generation (5G) of wireless communication, there may be new use cases for New Radio (NR) such as ultra-low latency and massive machine type communication. In LTE turbo codes were used for channel coding, but may not provide the performance that new use cases demand. New systems and methods designed for NR may be required to accommodate new use cases.

SUMMARY

A method and system for rate matching in a wireless communication system is disclosed. The method comprises receiving K information bits at a channel encoder and generating N output bits. The N output bits may be interleaved by an interleaver. In a HARQ retransmission the output bits may be placed into a circular buffer. The N output bits may be divided into two or more parts comprising at least a first part and a second part. The method further comprises mapping a first part of one or more parts of the N output bits to a $M_1$ ($=2^{m_1}$)-ary modulation and mapping a second part of one or more parts of the N output bits to a $M_2$ ($=2^{m_2}$)-ary modulation. The output bits may be transmitted by a wireless transmit/receive unit (WTRU), a base station or the like.

BRIEF DESCRIPTION OF THE DRAWINGS

A more detailed understanding may be had from the following description, given by way of example in conjunction with the accompanying drawings, wherein like reference numerals in the figures indicate like elements, and wherein.

DETAILED DESCRIPTION

Figure 1A:
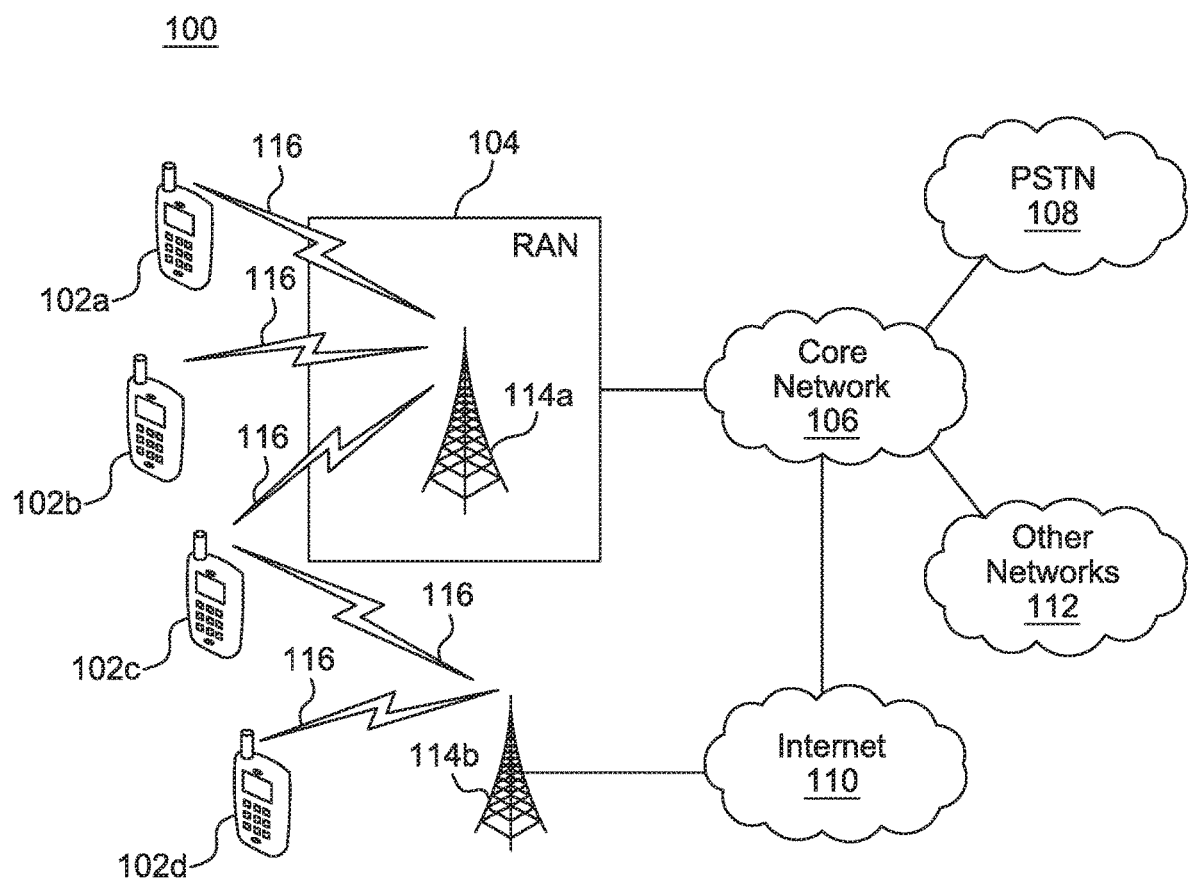
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
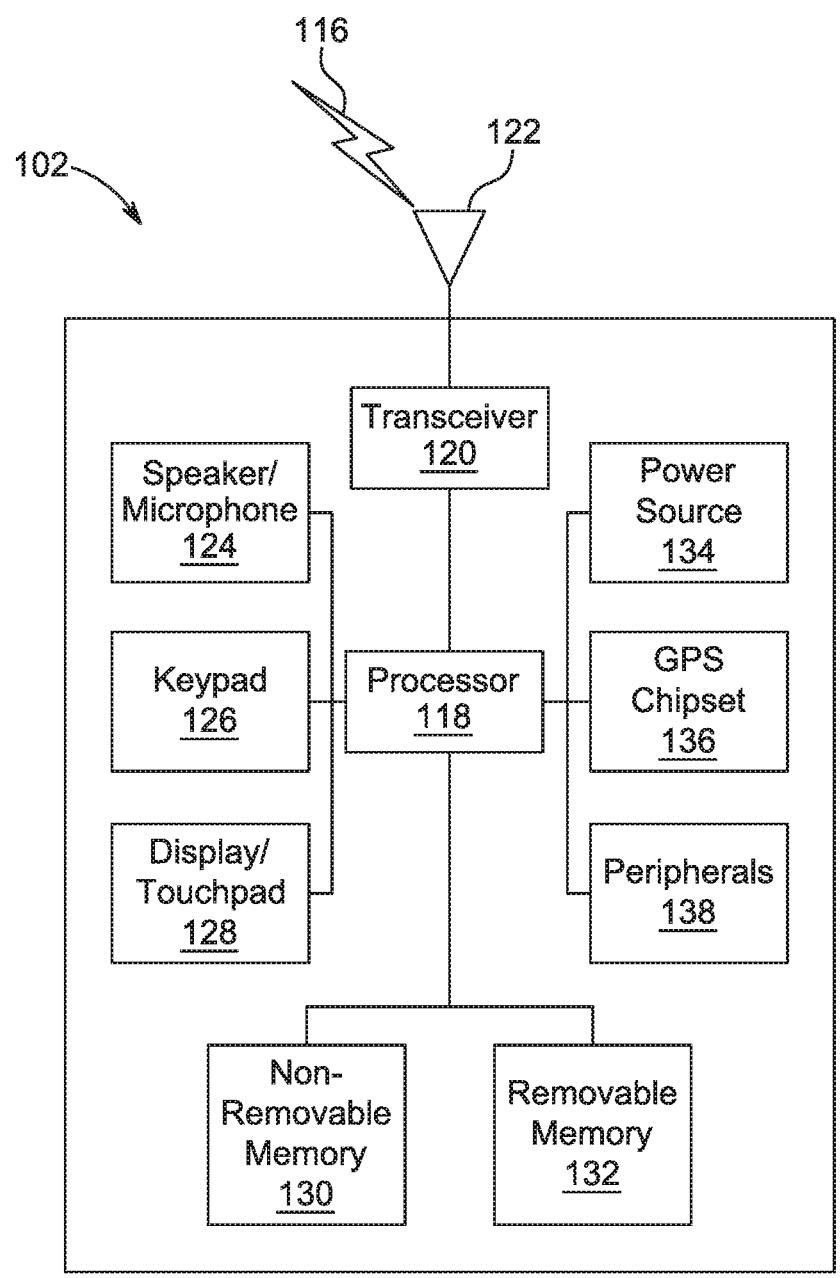
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit 139 to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Figure 1C:
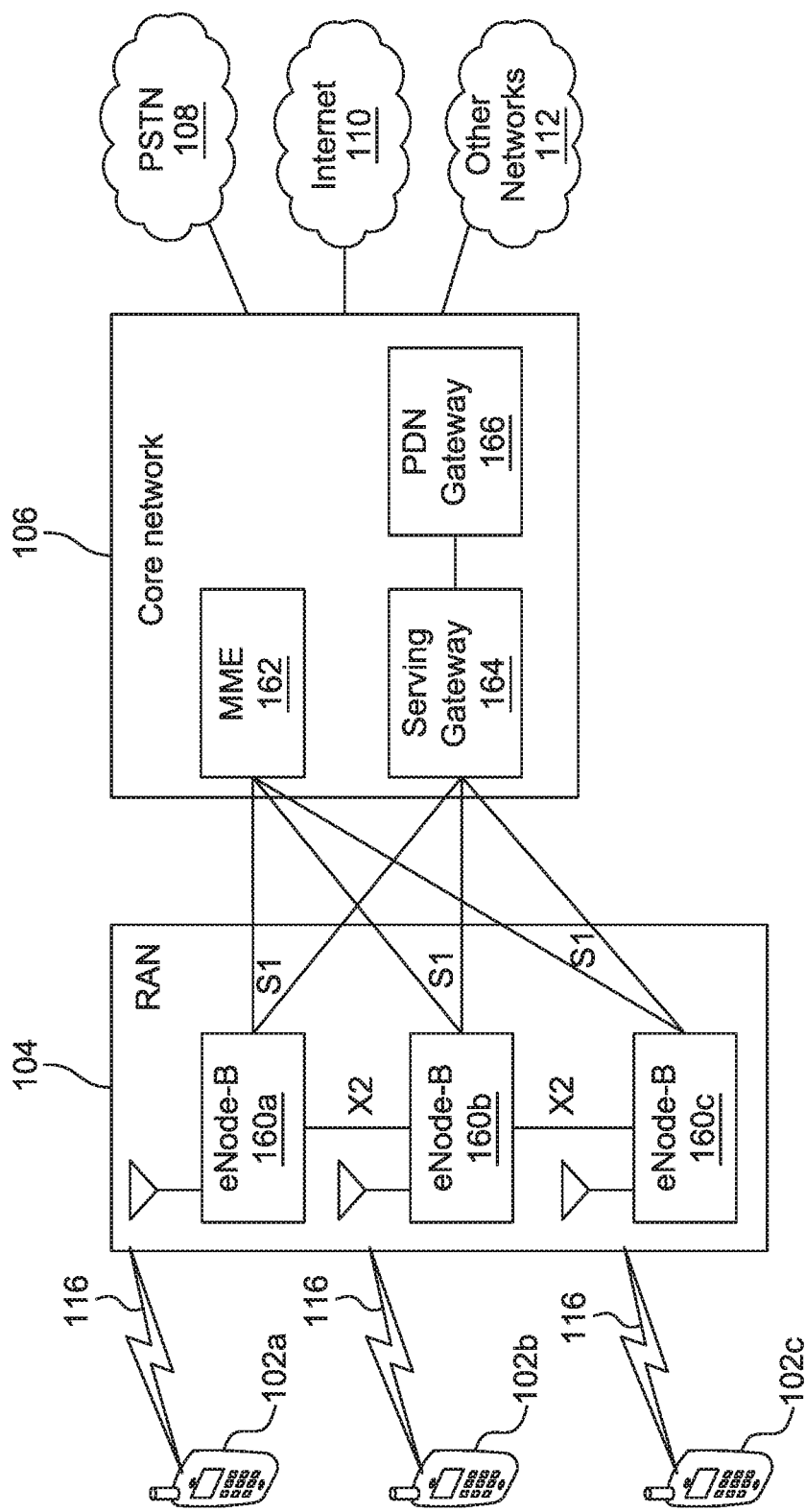
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
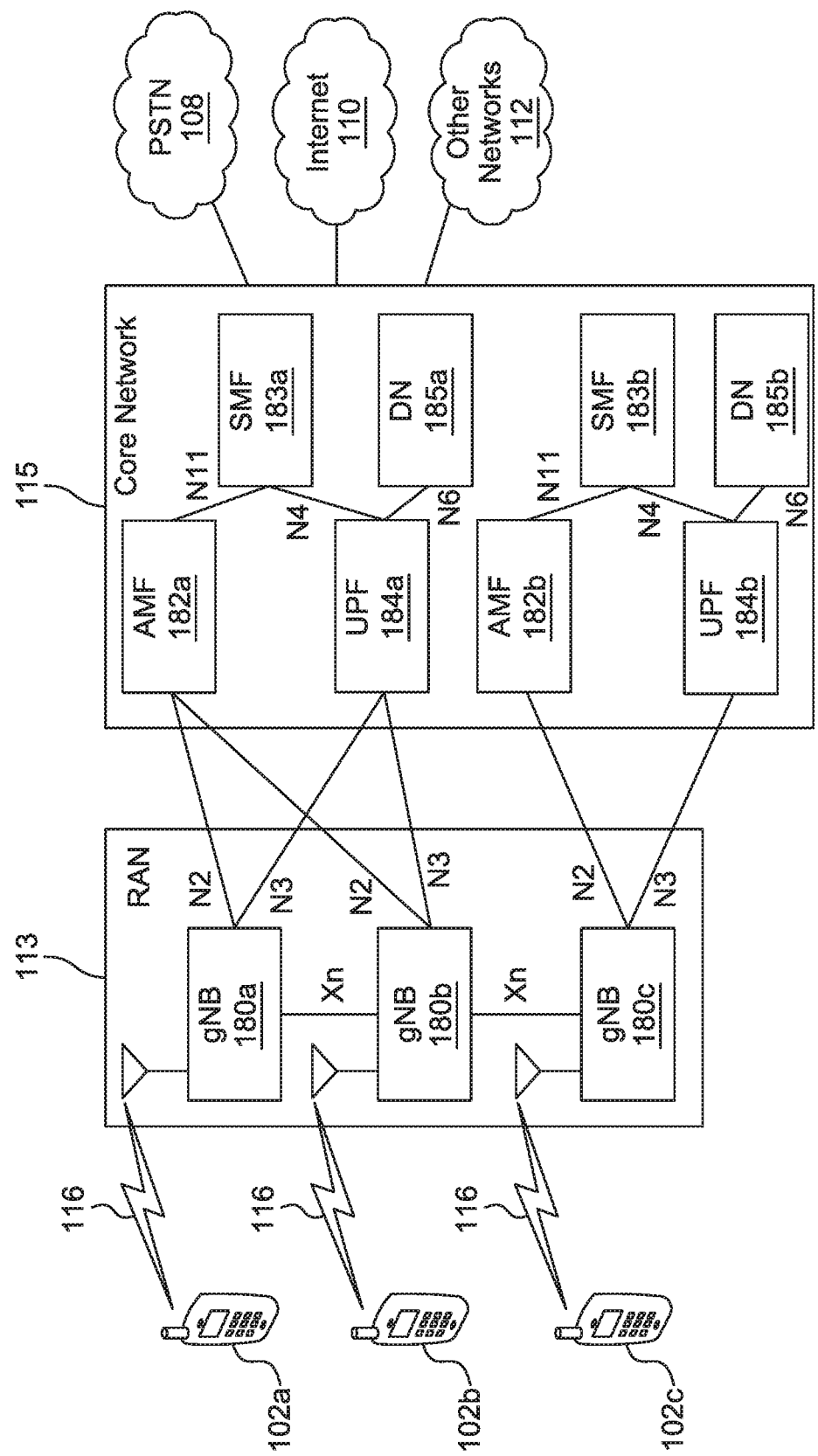
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a,184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-ab, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Communication in a RAN may be carried out according to a number of protocols. These protocols may be categorized into a number of layers, such as packet data convergence protocol (PDCP), Radio-link Control (RLC), Medium-access control (MAC), and a Physical layer (PHY). These layers may exist and have reciprocal functions in both a transmitting entity and a receiving entity. A transmitting entity may be a base station, such as a gNB, and a receiving entity, such as a WTRU, or these roles may be reversed. In the PHY layer channel coding/decoding, modulation/demodulation, multi-antenna mapping, and other related functions may be handled.

For channel coding, various approaches may be used such as Turbo Code, Low-Density Parity Code (LDPC), and/or Polar Codes. For NR use scenarios Polar Codes may be used because they present favorable results in encoding and decoding in addition to code construction when compared with other approaches.

There may be several methods of constructing Polar Codes to optimize communication performance. Code construction for Polar Codes may require calculating reliabilities of input bits and selecting frozen and unfrozen bits by sorting their reliabilities. A given code construction procedure may assume some specific conditions of channel characteristics and the final code construction may be changed if the channel characteristics, including the specific conditions, change.

In one scenario, rate-matching may be based on a puncturing scheme such as Quasi-Uniform Puncturing (QUP) where output bits may be punctured by a pattern of bit reversal that starts from the beginning. QUP shows good performance but code reconstruction is needed for every unique puncturing number. This means that the positions of frozen bits may be different for each additional puncturing bit. Code reconstruction of polar codes may require a large computational load if frequent rate matching needs to be applied for a coded block.

In one embodiment, there may be a puncturing scheme where output bits are punctured by a pattern of bit reversal, similar to QUP, but different in that the puncturing starts at the end of the coded bits instead. The decoder may assume that the corresponding input bits (gradually decreased index from the end) are set to 0 for calculating a log likelihood (LL). In this puncturing scheme no code reconstruction may be required, but the positions of frozen bits may be changed for each puncturing case.

Polar Code specific HARQ schemes may be employed to take advantage of the benefits of a Polar Code approach. A rate-matching scheme may be combined with any type of channel coding and modulation scheme, but performance improvements may be seen when using a Polar Code specific scheme, such as those discussed herein.

Figure 2A:
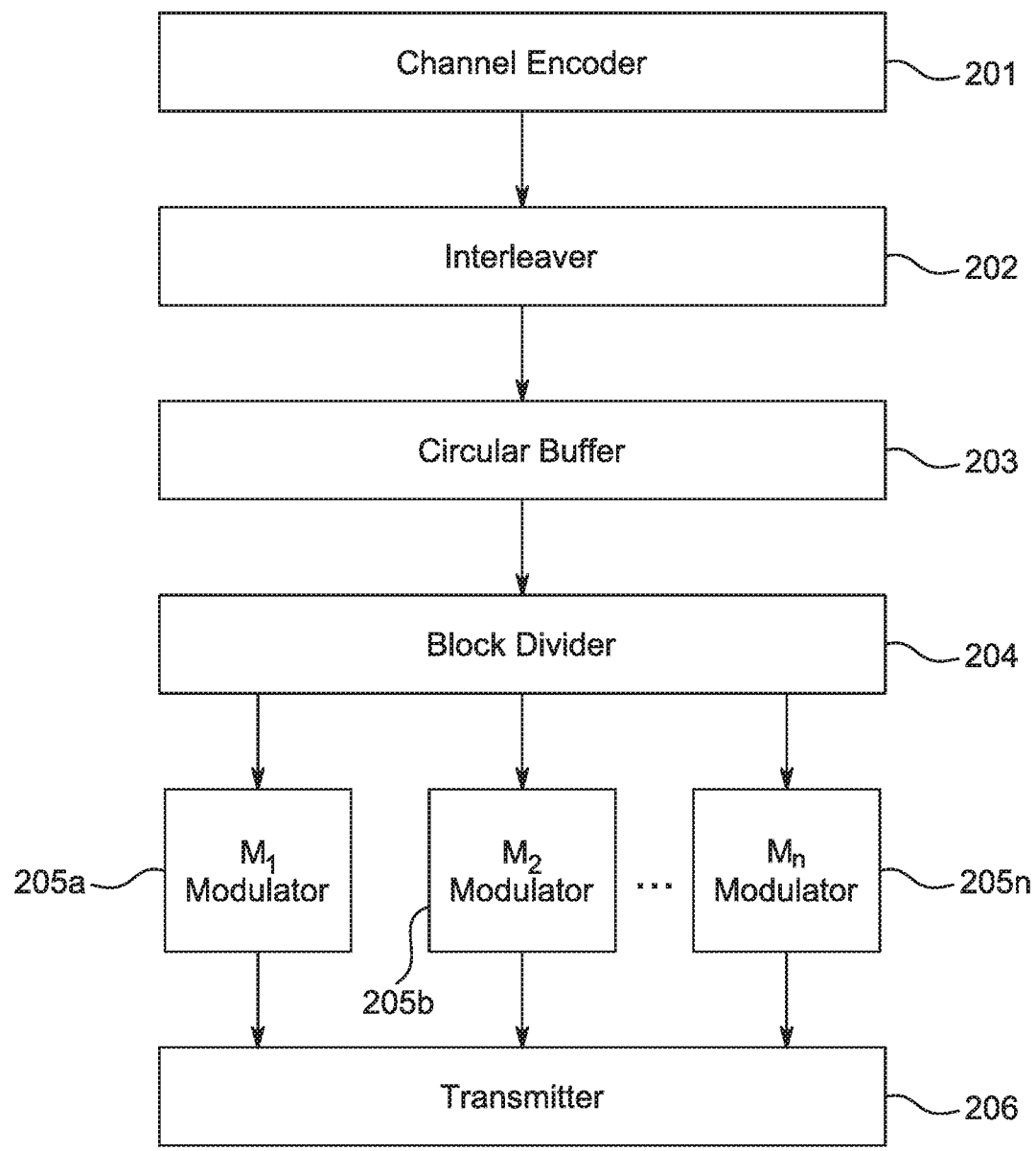
FIG. 2A is an example transmitter side process of a disclosed rate matching scheme as discussed herein.
Figure 2B:
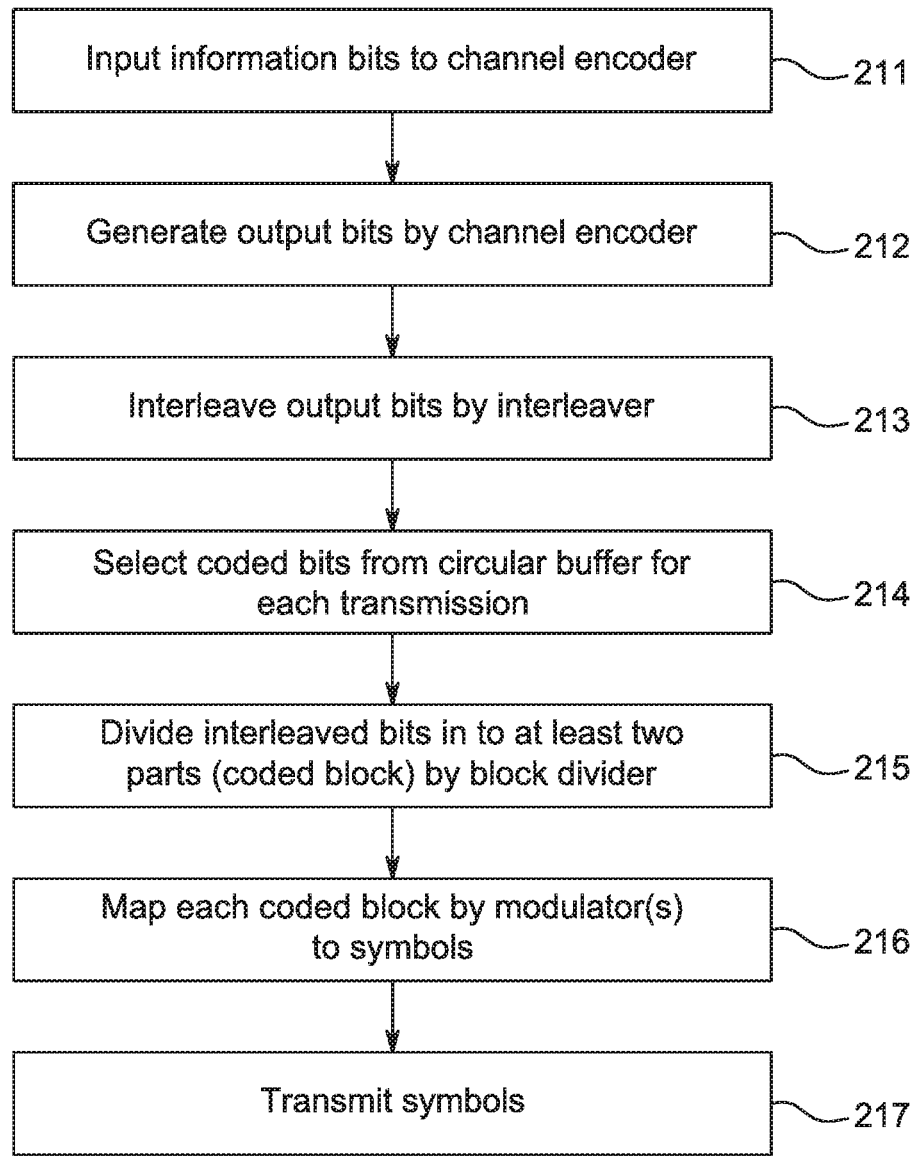
FIG. 2B is an example transmitter side process of a disclosed rate matching scheme as discussed herein.

FIG. 2A illustrates a non-exhaustive configuration of components used to implement one or more rate-matching embodiments for a transmitter. FIG. 2B illustrates an example procedure for rate-matching according to one or more embodiments for a transmitter. FIGS. 2A and 2B will be discussed in conjunction with one another. Initially at 211, K information bits are encoded 212 by the channel encoder 201 resulting in N output bits, also known as a coded stream (e.g., codeword). At 213, the N output bits are processed at an interleaver 202. After interleaving 213, there may be a circular buffer 203 before the block division that may exist for HARQ operation where some coded bits are selected 214 from the circular buffer 203 for each transmission. The selected coded stream from the circular buffer 203 is then divided 215 into at least two parts, each part also known as a coded block, by a block divider 204. The constant modulation for each block may result in a simple implementation for managing operations for a filter and/or power amp in the transmitter. The structure of the interleaver and the block divider may minimize required buffers to decode the received symbols at a receiver side during a HARQ processes.

After the division, each part (i.e., coded block) is mapped/modulated 216 by modulator 205a, 205b, . . . 205n (collectively known as modulator 205). In one example, a first part may be mapped by $M_1=2^{m_1}$ modulation, a second part may be mapped by $M_2=2^{m_2}$ modulation, and this may be repeated for n blocks using $M_n=2^{m_n}$, where $m_n$ is the $n^{th}$ codeword and $M_n$ is the n-ary (e.g., primary, secondary, etc.) number modulation. The modulated bits, also known as symbols, may be transmitted 217 by a transmitter 206.

Figure 2C:
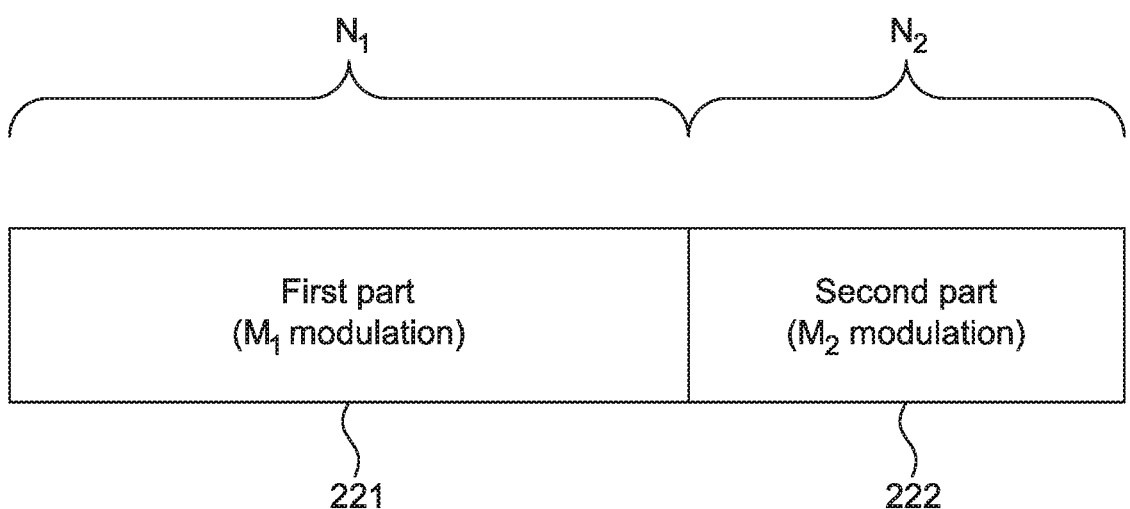
FIG. 2C is an example transmission diagram according to a rate matching scheme as discussed herein.

FIG. 2C illustrates an example where the N bit coded stream is divided into two parts of a first part 221 with $M_1$ modulation and a second part 222 with $M_2$ modulation. However, any of the embodiments discussed herein may not be restricted to two parts and may have any number of parts as explained with reference to FIGS. 2A and 2B.

In one scenario, a rate-matching scheme may assume a single modulation scheme ($M_1$-ary modulation) during one transmission time interval (TTI) where $$\frac{N}{m_1}$$

is representative of the number of modulation symbols for the whole coded bit stream, (i.e, codeword). If P bits are punctured from the output bits, the number of modulation symbols is reduced to $$\left\lceil \frac{N-P}{m_1} \right\rceil$$

where $\lceil x \rceil$ is the minimum integer larger than X.

In an embodiment related to the example shown in FIG. 2, a rate-matching scheme may have $$N_2 = \left\lceil \frac{m_2}{m_2 - m_1} P \right\rceil$$

consecutive bits mapped as $M_2$-ary symbols and $$N_1 = N - \left\lceil \frac{m_2}{m_2 - m_1} P \right\rceil$$

consecutive bits are mapped as $M_1$-ary symbols. Further, no explicit puncturing of the bit stream may be employed, but an implicit puncturing scheme may be performed where the modulation order of each divided codeword part is selected in accordance with the number of bits in these parts. By applying two different modulation orders (i.e., $m_1$ and $m_2$), it can achieve the equivalent rate-matching function as puncturing P bits for single modulation order (i.e., $m_1$).

In one example it may be assumed that N=1024 and P=128 for a coding scheme. The scheme may initially select the modulation order of the parts, such as $m_1=1$ and $m_2=2$. Then, using the segmentation described herein, the number of bits in each part is determined, that is $$N_2 = \left\lceil \frac{m_2}{m_2 - m_1} P \right\rceil = 256$$

and $N_1$=N−$N_2$=768. That is, the first 768 bits are modulated as Binary Phase Shift Keying (BPSK) symbols and the remaining 256 bits are modulated as 128 Quadrature Phase Shift Keying (QPSK) symbols. The total number of modulation symbols is 896 symbols and it has the same number of symbols when 128 bits are punctured and BPSK is adopted as the modulation scheme for all punctured bits. In another example, different modulation techniques may be used such as any type of phase-shift keying (PSK), frequency-shift keying (FSK), amplitude-shift keying (ASK), and/or quadrature amplitude modulation (QAM).

For values of $m_1$ and $m_2$, the condition of $m_2-m_1=1$ might be preferred to improve granularity but another configuration where $m_2-m_1>1$ may also be applied without a loss of generality.

As described herein, a reconstruction process of encoding at the codeword parts may not be required, hence the position of frozen bits may be kept the same. This outcome may provide a significant reduction in encoding computation in case of rate matching for polar codes.

Figure 3A:
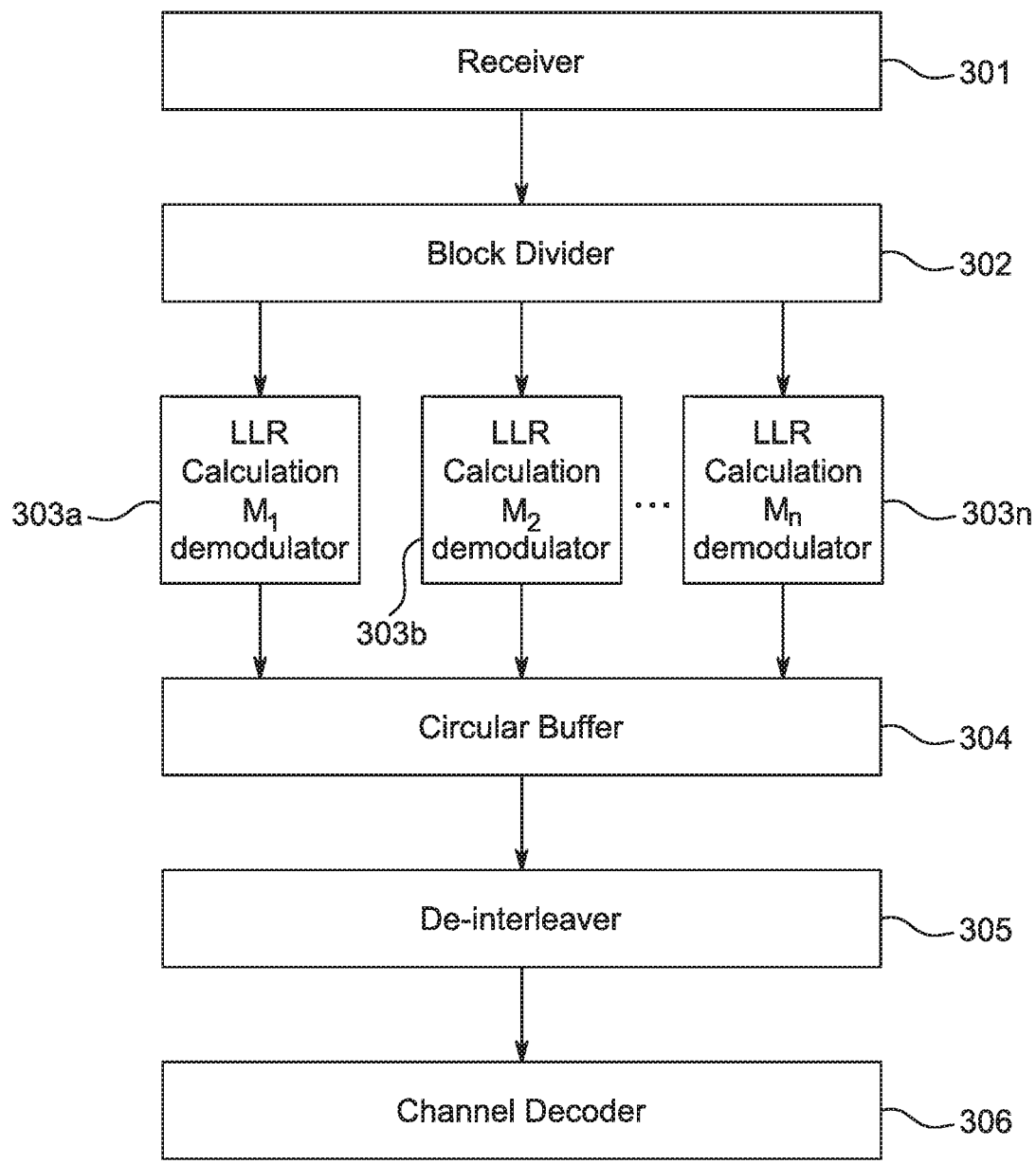
FIG. 3A is an example receiver side process of a rate matching scheme as discussed herein.
Figure 3B:
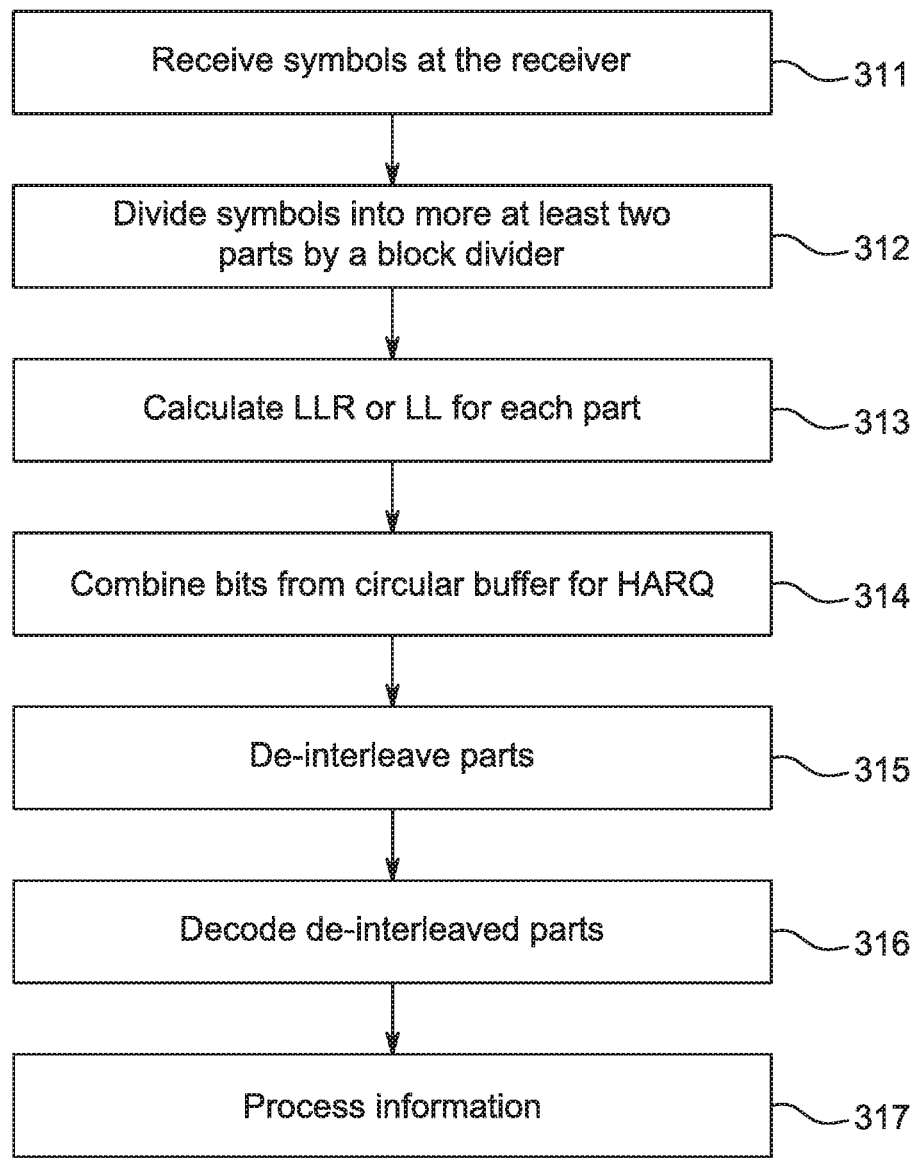
FIG. 3B is an example receiver side process of a rate matching scheme as discussed herein.

FIG. 3A illustrates a non-exhaustive configuration of components used to implement one or more rate-matching embodiments for a receiver. FIG. 3B illustrates an example procedure for rate-matching for a receiver according to one or more embodiments. FIGS. 3A and 3B will be discussed in conjunction with one another. Initially at 311, symbols may be received at a receiver 301 from a channel. The received symbols may then be divided 312 into two parts at a block divider 302. A log likelihood ratio (LLR) values or LL values may be computed 313 by a demodulator (or demapper) for each part 303a, 303b, ... 303n, where n is the number of parts. Depending on the modulation order and the constellation adopted for each block, the LLR or LL calculation method may be different. In one example, depending on the selection of the modulation orders for each codeword part, for example, $m_1$ and $m_2$ in case of two parts, the transmitter may have sent the modulation indices to the receiver along with the other decoding related information to be used at the receiver. After the LLR or LL calculation 313, the parts are combined 314 with other bits in the circular buffer 304 and then de-interleaved 315 by a de-interleaver 305 based on the interleaving pattern of the transmitter side. After de-interleaving 315, the de-interleaved parts are input to a channel decoder 306 to be decoded 316 and the original information bits are output from the channel decoder 306 for processing 317.

Figure 4:
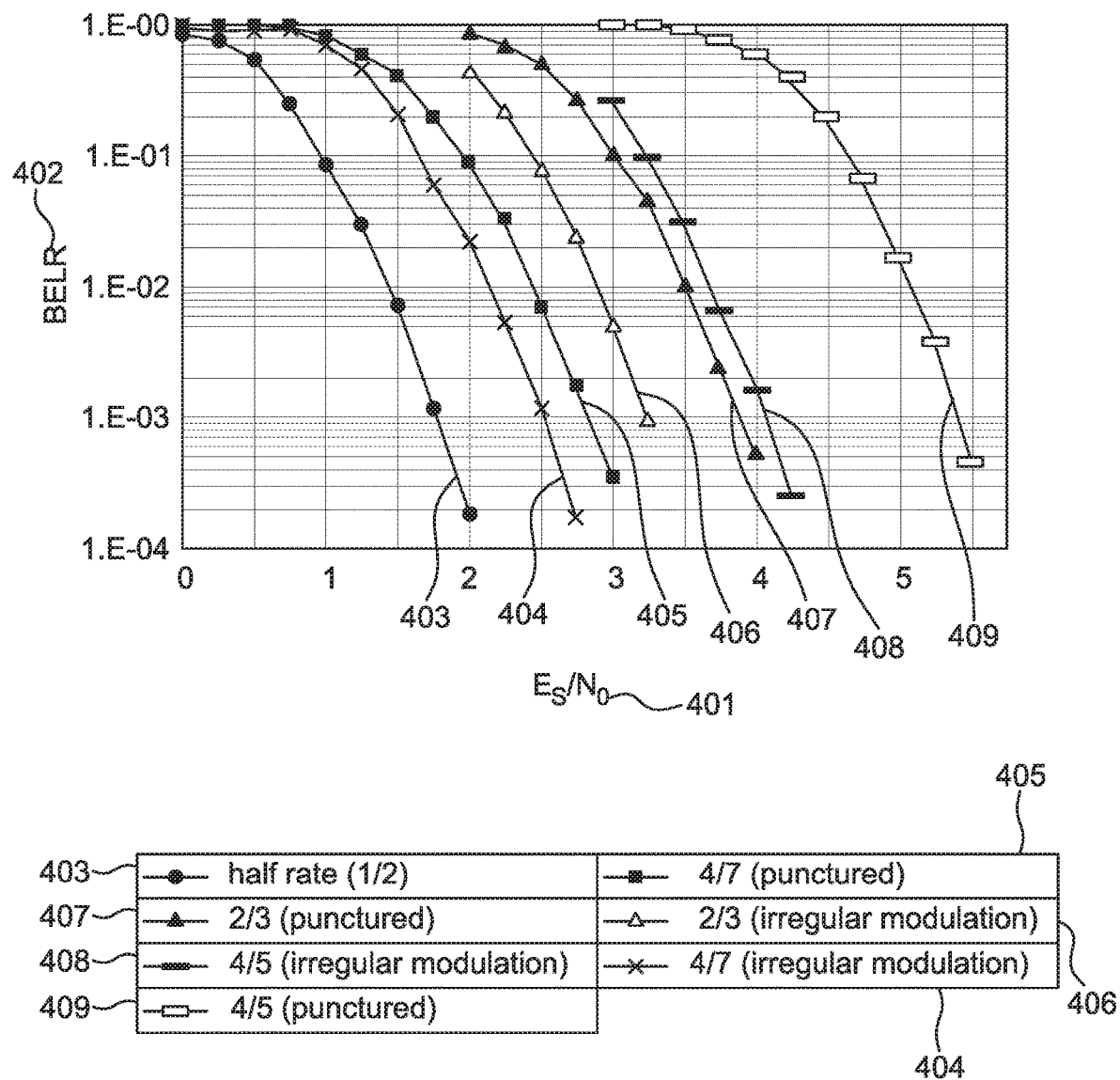
FIG. 4 shows Block Error Rate (BLER) comparisons of conventional puncturing schemes for polar codes.

FIG. 4 shows a Block Error Rate (BLER) test of the rate-matching techniques and embodiments disclosed herein compared to an alternative puncturing scheme with polar code encoding. The horizontal axis shows a normalized signal to noise ration $E_s/N_0$ 401. The vertical axis shows the BLER 402 ratio that is defined by the number of erroneous blocks received to the total number of blocks sent (an erroneous block being a transport block that has different decoded bit(s) from the information bits sent by the transmitter). The rate-matching techniques and embodiments disclosed herein are indicated by the designation irregular modulation scheme. These results comprise examples of a 4/7 coding rate with an irregular modulation scheme at 404, a 2/3 coding rate with the irregular modulation scheme at 406, and a 4/5 coding rate with an irregular modulation scheme at 408. The results from the techniques and embodiments disclosed herein were compared to alternative methodologies of polar code with N=1024 and K=512 and rate-matched to example situations of a 1/2 coding rate 403, a 4/7 coding rate with a puncturing scheme at 405, a 2/3 coding rate with a puncturing scheme at 408, and a 4/5 coding rate with a puncturing scheme at 409. As can be seen, the disclosed techniques and embodiments have coding gains of 0.3 dB, 0.6 dB and 1.3 dB over the alternative puncturing scheme at a BLER of $10^{-3}$ while having the same spectral efficiency.

In one embodiment, a HARQ procedure may involve a retransmission technique that is based on the rate matching block as discussed herein. The bit position may be defined as bit index 0~N-1 for bits after channel coding and interleaving. Some of the parameters used for describing this HARQ scheme are: $b_i$ may represent a starting bit index of an i-th retransmission; $L_i$ may represent a length of an i-th retransmission; and $c_i$ may represent an offset value of an i-th retransmission. The starting bit index of the i-th retransmission (i.e., the (i+1)-th transmission), $b_i$, may be defined as in Equation 1. For i>1, $$b_i = \left(b_1 + \sum_{j=1}^{i-1} L_j + \sum_{j=1}^{i-1} c_j\right) \bmod N \quad \text{Equation 1}$$

Where a modular operator a mod b is the remainder of a/b. Where i=0 corresponds to the first transmission and i>0 corresponds to the retransmission when there are errors in decoding the first transmission. Thus, i=1 corresponds to the first retransmission, also known as the second transmission, after the first transmission (i=0). Accordingly, where i=0, then $b_i$=0.

Additionally, $b_1$ may be set to $N_1+c_1$, without a loss of generality, and the second transmission in HARQ may start from the same starting bit index of $M_2$-ary modulation.

The values of $L_i$ (i>0) may be determined by a base station, or other such node, depending on an established link adaptation scheme and this information may be sent to the receiver via corresponding control channel information. The base station may select a modulation and coding scheme (MCS) level for downlink and/or uplink transmission according to measurement information or adaptation strategy, and $L_i$ may be calculated based on the base station's scheduling algorithm. The modulation order for the transmitted bits may be constant. For some cases, $L_i$ may be equal for all i>0 and $L_i$=L. Further, $c_i$ may be set to zero for all values of i. Some performance gain may be expected by setting $c_i$ to other values rather than zero.

Figure 5:
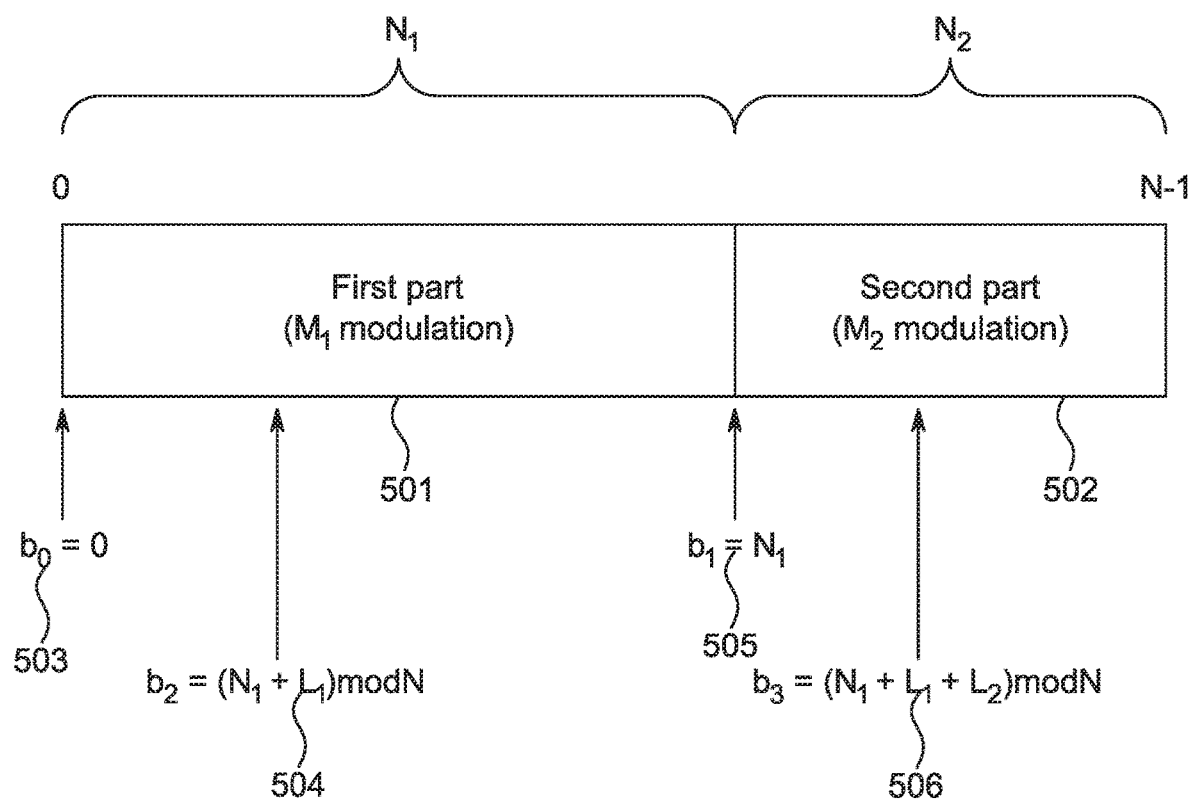
FIG. 5 is an illustration of block division after interleaving.

FIG. 5 illustrates an example where the N bit coded stream is divided into two parts of a first part 501 with $M_1$ modulation and a second part 502 with $M_2$ modulation. However, any of the embodiments discussed herein may not be restricted to two parts and may have any number of parts. Along the horizontal axis may be considered the bit index, which starts at 0 and goes to N-1. The example of FIG. 5 shows an instance where $c_i$=0 for all i. It then follows that in this example, for i=0 then $b_0$=0 at 503; for i=2 then $b_2$=($N_1+L_1$)mod N at 504; for i=1 then $b_1$=$N_1$ at 505; and for i=3 then $b_3$=($N_1+L_1+L_2$)mod N at 506.

Before block division in the transmitter as shown in FIG. 2A, the interleaved bits may be stored in a circular buffer and the bits for each transmission of HARQ operation may be selected in a bit selection block. In the first transmission, all N(=$L_0$) bits may be selected and $L_i$ bits may be selected for i-th retransmission.

In the receiver, the received symbols in the retransmissions may not be divided in the block divider in FIG. 2B differently from the first transmission. The proper positions for LLR or LL values in a circular buffer may be selected in a bit selection block and they may be stored or combined with the conventional values in the positions of the circular buffer for HARQ operation.

For a modulation adopted for the first transmission and retransmissions thereafter, the reliability of each bit position in a mapping may vary, which may be compensated for by combining a retransmitted block with a different order of mapping input bits. The offset $c_i$ may change the order of mapping input bits.

Figure 6:
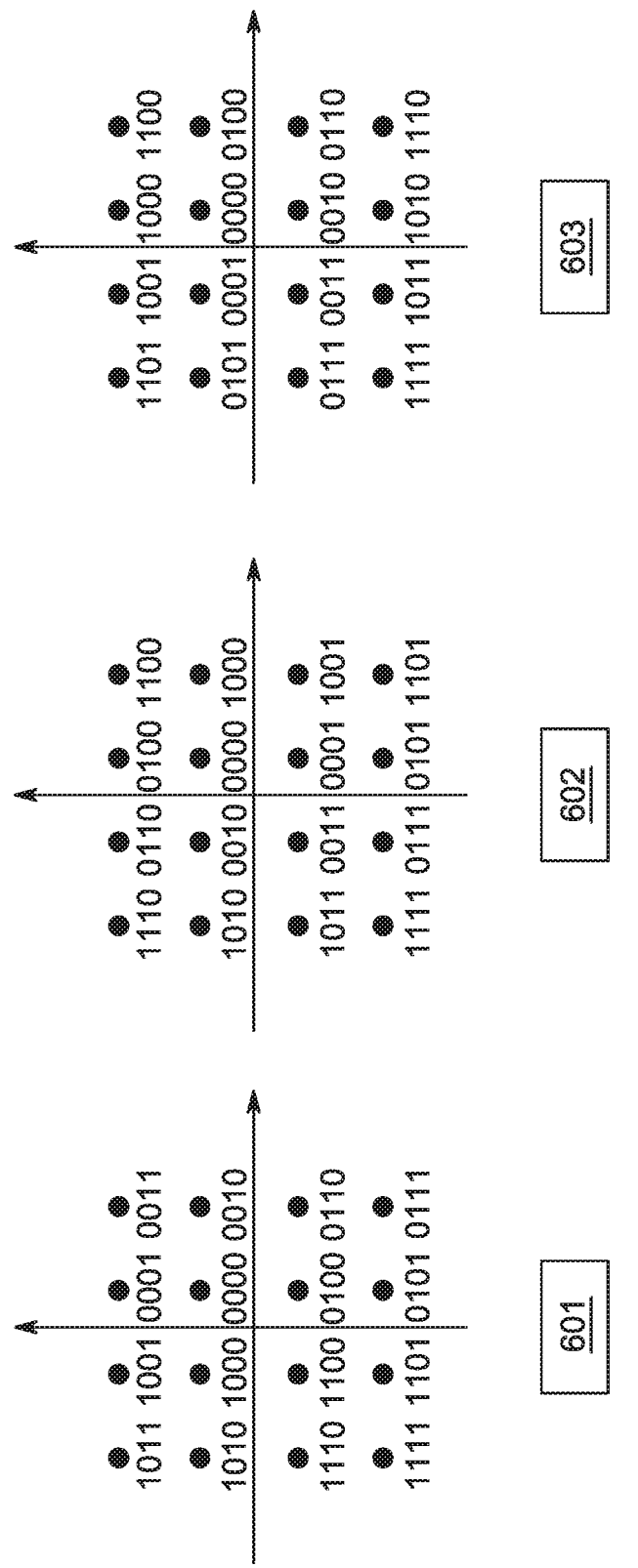
FIG. 6 is an illustration of Quadrature Amplitude Modulation (QAM) constellations and effective constellation by offset.

FIG. 6 shows an example of an LTE QAM constellation and effective constellations when offset according to the embodiments disclosed herein. When the QAM constellation shown in 601 is applied in the first transmission, some coding gain may be achieved in the first retransmission (the second transmission) by setting $c_1$ to 2. Four bits indicate a QAM symbol and the reliability of each bit position is different in 601. Where "abcd" indicates a QAM symbol, and "ab" has larger reliability than "cd", then there may be some coding gain by combining less reliable bit(s) in the first transmission with more reliable bit(s) in the first retransmission (the second transmission). In 602, the effective constellation in the second transmission is shown when $c_1$=2. By shifting two symbols, "ab" and "cd" in the first transmission then they may be combined with "cd" and "ab" in the second transmission respectively.

For the retransmissions of i>1, $c_i$ may be set to maximize a coding gain. In one example QAM, when $c_i=2$ then i=odd, and when $c_i=0$ then i=even.

Instead of offsets, a different modulation mapping may be used to improve gains of each retransmission. For example, a bit reversed mapping as shown in 603 may be used in the first retransmission (the second transmission). In such an example, the bit reversed mapping may be used when i=odd and the same mapping as the first transmission may be used when i=even.

For a HARQ scheme according to one of the embodiments disclosed herein, the effective code rate $R_i$ of for each transmission may be derived as shown in Equation 2.

$$R_i = \frac{K}{N + \sum_{j=1}^{i} L_j} \qquad \text{Equation 2}$$

The effective spectral efficiency $S_i$ of the disclosed HARQ scheme for each transmission may be derived as shown in Equation 3.

$$S_i = \frac{K}{\frac{N_1}{m_1} + \frac{N_2}{m_2} + \sum_{j=1}^{i} \frac{L_j}{m_i^r}} \qquad \text{Equation 3}$$

In Equation 3, $m_i^r$ is the modulation order adopted for i-th retransmission. In one option, the modulation order of $m_i^r$ may be selected in conjunction with the puncturing number, P. Hence, the modulation order of each retransmission may be selected such that the overall puncturing number, P, is satisfied after all retransmissions are completed. In this case, the transmitter may identify $m_i^r$, where i={1, . . . }, such that an overall puncturing ratio, P, is satisfied for the encoded codeword. The modulation series corresponding to the retransmission parts may be sent to the receiver via a control channel along with the other retransmission related information.

Figure 7A:
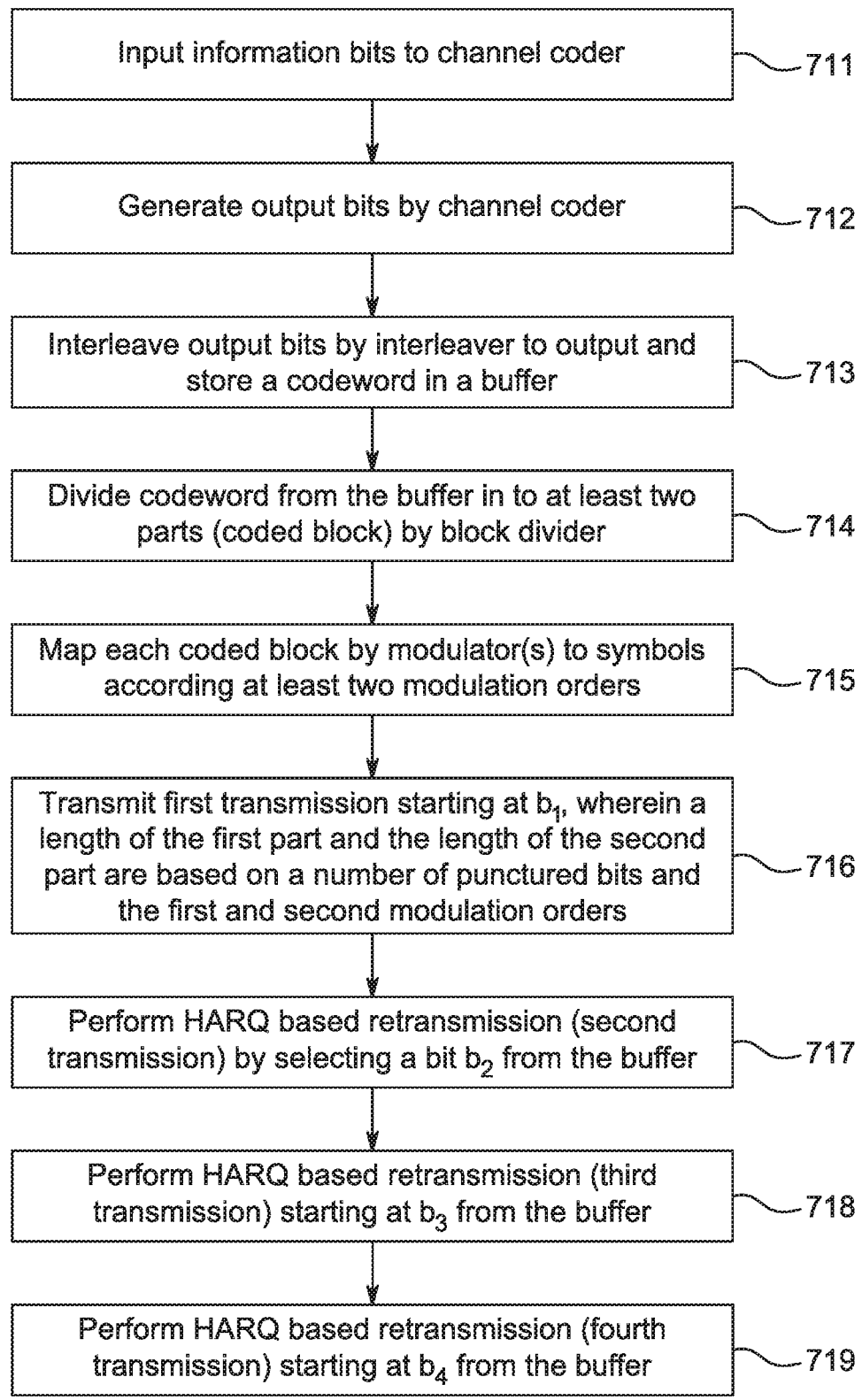
FIG. 7A is an example of a disclosed hybrid automatic repeat request (HARQ) process.
Figure 7B:
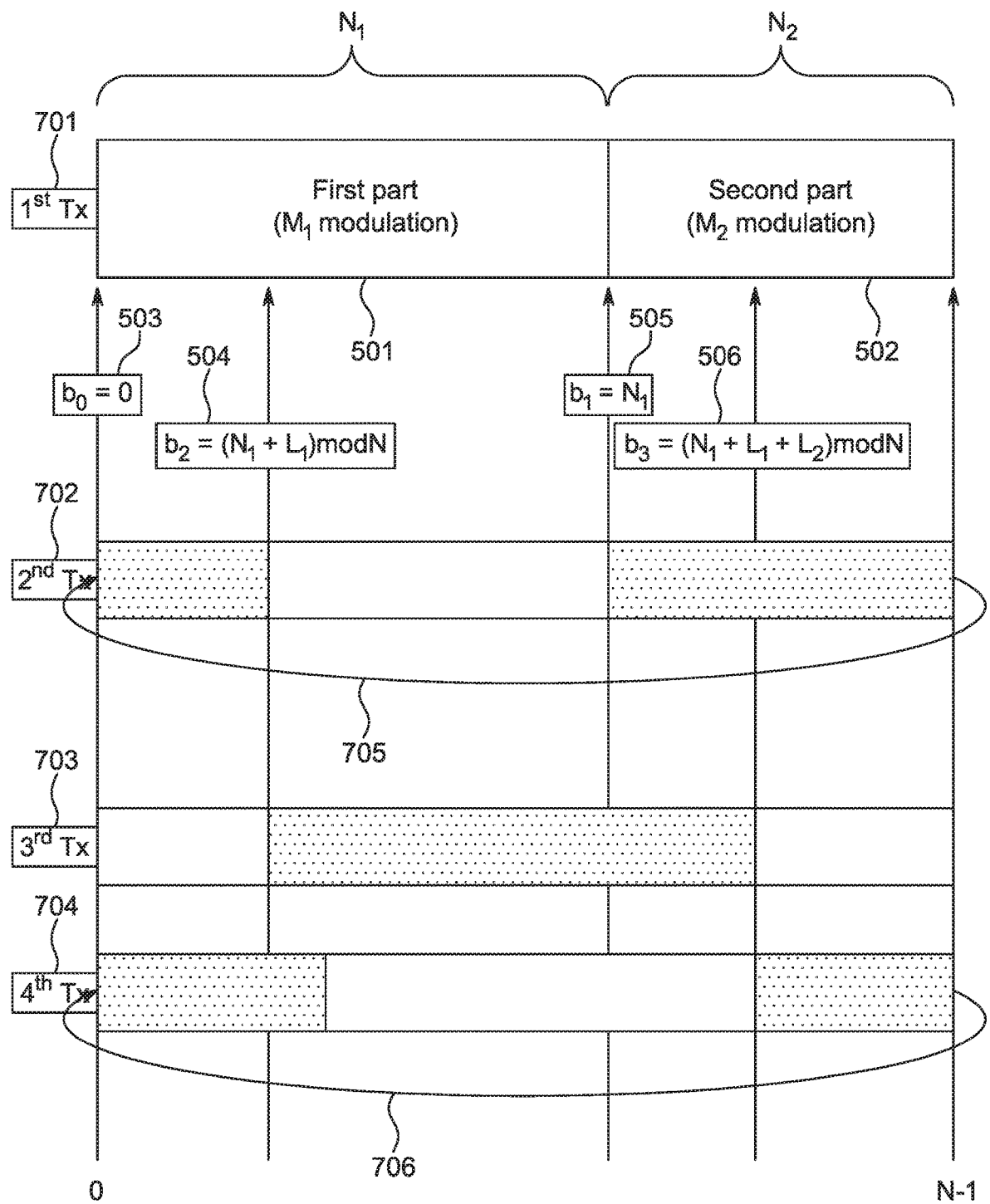
FIG. 7B is an example of a disclosed hybrid automatic repeat request (HARQ) process.

FIGS. 7A and 7B are an example of a HARQ scheme according to one or more techniques or embodiments as disclosed herein. Similar numbering and meaning may be taken from the elements and related description of FIG. 5. There may be a first transmission with a first part 501 and a second part 502.

In the retransmissions, a single constant modulation may be used as Equation 3 and multiple modulations may also be applied. The retransmitted bit block with length $L_j$ may be divided into multiple blocks, each with a different modulation. The division border in the retransmitted bit block may follow the same border as in the first transmission. For example, $M_1$-ary modulation may be used for the second part and $M_1$-ary modulation may be used for the first part in the retransmission 702, 705. By using different modulations from the first transmission 701, the decoder may have more combining gain.

Initially at 711, K information bits are input to the channel encoder and N output bits, also known as coded stream (e.g., codeword), are generated at 712. Next, the generated N output bits are interleaved 713 and stored in a circular buffer. The coded stream is then divided 714 into at least two parts $N_1$ and $N_2$, each part also known as a coded block, by a block divider. After the division, each part (i.e., coded block) is mapped/modulated 715 by modulators of different orders. In one example, a first part may be mapped by $M_1=2^{m_1}$ modulation, a second block may be mapped by $M_2=2^{m_2}$ modulation, and this may be repeated for n blocks using $M_n=2^{m_n}$, where $m_n$ is the $n^{th}$ codeword and $M_n$ is the n-ary (e.g., primary, secondary, etc.) number modulation. The modulation generates symbols that are then transmitted 716 in a first transmission 701 starting at bit $b_0$ 503 with length $L_0$. After the first transmission 701, the retransmissions may start when the receiver finds error(s) in the decoded bits and send a negative acknowledgement to the transmitter for each transmission. The retransmissions may not start if the receiver finds no error in the decoded bits and may send a positive acknowledgement to the transmitter. In a situation where retransmission is needed, at 717 a HARQ based retransmission (second transmission 702) may start at bit $b_1$ 505 with length $L_1$. Note that because the second transmission 702 starts at bit $b_1$ 505, which is the beginning of the second part 502, the buffer becomes circular in nature as shown with arrow 705 and continues into the first part 501. At 718 a HARQ based retransmission (third transmission 703) may start at bit $b_2$ 504 with length $L_2$. At 719 a HARQ based retransmission (fourth transmission 704) may start at bit $b_3$ 506 with length $L_3$. Note that because the fourth transmission 702 starts at bit $b_3$ 506, which is past the beginning of the second part 502, the buffer becomes circular in nature as shown with arrow 706 and continues into the first part 501. This example may be similar to a "circular buffer" in one or more LTE specifications. Each transmission may be a different revision number as discussed herein.

In one instance the starting bit index in a HARQ first retransmission may start in the starting bit index of the second part. Alternatively or in combination, the starting bit index in all retransmissions may have offsets to improve performance. The number of bits in each part and modulation order may be determined based on the equation described with reference to the disclosed rate matching method, which is equivalent to puncturing P bits. The channel coded bits that are interleaved and divided into multiple parts may use different modulations for each part.

In one example, the relation between rv and $b_i$ may be defined as in Table 1 below. In the table, rv may be defined as an integer with a length of two bits that may correspond to the bit position previously defined as $b_i$. The rv may be assigned by base stations, or other such nodes, and changed for each resource allocation. The rv may be sent to a WTRU by a control channel, such as PDCCH, or may be defined by a predetermined rule like 00→10→01→11.

TABLE 1

Example relationship between redundancy version and bit starting position

| rv | Bit position |
| --- | --- |
| 00 | $b_0$ |
| 01 | $b_1$ |
| 10 | $b_2$ |
| 11 | $b_3$ |

Figure 8:
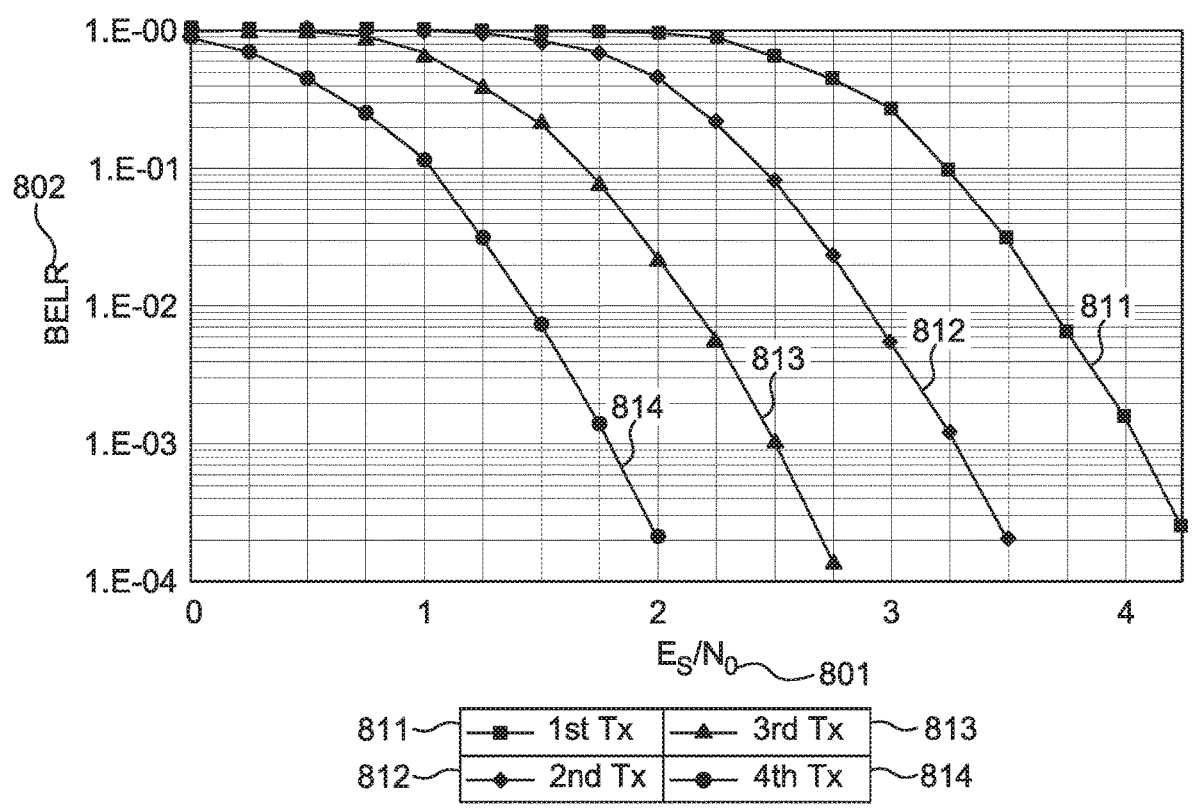
FIG. 8 is an example graph of a BLER performance of the disclosed HARQ method.

FIG. 8 shows an example of a BLER performance according to embodiments for a HARQ scheme when polar codes are assumed as the channel coding scheme as disclosed herein. The horizontal axis shows a normalized signal to noise ration $E_s/N_0$ 401. The vertical axis shows the BLER 402 ratio that is defined by the number of erroneous blocks received to the total number of blocks sent (an erroneous block being a transport block that has different decoded bit(s) from the information bits sent by the transmitter.). The disclosed HARQ scheme provides coding gains of 0.8 dB, 1.55 dB and 2.3 dB at a BLER of $10^{-3}$ over the 1st 811 transmission from $2^{nd}$ 812, $3^{rd}$ 813, and 4th 814 transmissions (1st, 2nd and 3rd retransmissions). In each retransmission, the incremental redundancy corresponding to the first transmission is retransmitted for HARQ operation.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

The invention claimed is:

1. A method for rate matching a signal transmission, the method comprising:
    generating a codeword by encoding and interleaving a plurality of information bits;
    dividing the codeword into a first block of coded bits and a second block of coded bits;
    mapping the first block of coded bits according to a first modulation order, the first modulation order based on a number of bits in the first block of coded bits, and mapping the second block of coded bits according to a second modulation order, the second modulation order based on a number of bits in the second block of coded bits;
    modulating the bits in the first block as first modulation scheme symbols corresponding to the first modulation order and modulating the bits in the second block as second modulation scheme symbols corresponding to the second modulation order, thereby rate matching without puncturing the codeword in a manner equivalent to rate matching with puncturing the codeword by a number of bits equal to the first modulation order and transmitting the remaining codeword bits according to the second modulation scheme; and
    sending a first transmission including at least one of the first modulation scheme symbols and at least one of the second modulation scheme symbols.

2. The method of claim 1, wherein the method further includes performing the encoding according to an encoding scheme, and wherein the first modulation order and the second modulation order are based on the encoding scheme.

3. The method of claim 2, wherein the encoding scheme maps K information bits to N output bits per codeword with P punctured bits, such that the number of bits in the second block of coded bits is $N_2$ and the number of bits in the first block of coded bits is $N_1=N-N_2$, and wherein $N_1$ bits are modulated according to the first modulation scheme and $N_2$ bits are modulated by a modulation scheme defined by a modulation order equal to P.

4. The method of claim 3, further comprising sending a second transmission after the first transmission, the second transmission starting at one or more bits offset from an end of the first transmission, wherein the second transmission is a retransmission.

5. The method of claim 1, wherein the encoding is performed for HARQ-based transmissions and the method further comprises sending a second transmission after the first transmission, wherein the second transmission is a retransmission.

6. The method of claim 5, wherein the second transmission includes at least one symbol corresponding to the first modulation scheme modulation order and at least one symbol corresponding to the second modulation scheme modulation order.

7. An apparatus for rate matching including:
    a processor configured to:
        generate a codeword by encoding and interleaving a plurality of information bits;
        divide the codeword into a first block—of coded bits and a second block of coded bits;
        map the first block of coded bits according to a first modulation order selected based on a number of bits in the first block to generate first symbols and map the second block of coded bits according to a second modulation order selected based on a number of bits in the second block to generate second symbols;
        select a first modulation scheme corresponding to the first modulation order and a second modulation scheme corresponding to the second modulation order such that the apparatus performs rate matching without puncturing the codeword in a manner equivalent to rate matching with puncturing the codeword by a number of bits equal to the first modulation order and transmitting the remaining codeword bits according to the second modulation scheme; and
    a transceiver operatively coupled to the processor, the transceiver and processor configured to to send a first transmission comprising at least one of the first modulation scheme symbols and at least one of the second modulation scheme symbols.

8. The apparatus of claim 7, wherein the processor is further configured to perform the encoding according to an encoding scheme and wherein the first modulation order and the second modulation order are based on the encoding scheme.

9. The apparatus of claim 8, wherein the encoding scheme maps K information bits to N output bits per codeword with P punctured bits, such that the number of bits in the second block of coded bits is $N_2$ and the number of bits in the first block of coded bits is $N_1=N-N_2$, and wherein the $N_1$ bits are modulated according to the first modulation scheme and the $N_2$ bits are modulated according to a modulation scheme defined by a modulation order equal to P.

10. The apparatus of claim 9, wherein the encoding is performed for HARQ-based transmissions and wherein the transceiver and processor are further configured to send a second transmission after the first transmission starting with the N2 bits, wherein the second transmission is a retransmission.

11. The apparatus of claim 10, wherein the second transmission includes at least one of the first symbols and at least one of the second symbols.

12. The apparatus of claim 9, wherein the transceiver and processor are further configured to send a second transmission after the first transmission, the second transmission starting at one or more bits offset from an end of the first transmission, wherein the second transmission is a retransmission.

\* \* \* \* \*